US006971092B1

(12) United States Patent
Chilimbi

(10) Patent No.: US 6,971,092 B1
(45) Date of Patent: *Nov. 29, 2005

(54) SYSTEM AND METHOD FOR ANALYZING DATA ACCESSES OF A TRACE FROM A COMPUTER-EXECUTABLE PROGRAM TO DETERMINE DATA ACCESS PATTERNS

(75) Inventor: Trishul M. Chilimbi, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 582 days.

This patent is subject to a terminal disclaimer.

(21) Appl. No.: 09/939,172

(22) Filed: Aug. 24, 2001

(51) Int. Cl.[7] .................................................. G06F 9/45
(52) U.S. Cl. ..................... 717/158; 717/128; 717/156; 711/118; 712/207
(58) Field of Search ................................ 717/128, 130, 717/155, 156, 158, 140–147; 711/118; 712/207, 712/227; 714/35, 38

(56) References Cited

OTHER PUBLICATIONS

Larus-Schnarr, EEL: Machine-Independent Executable Editing, Feb. 1995, ACM SIGPLAN'95, LaJolia, CA.*
Cohn-Lowney, Hot Cold Optimization of Large Windows/NT Applications, 1996, IEEE.*
Rosenberg-Jacobson-Sazeides-Smith, Trace Processors, 1997, IEEE.*
Nevill-Manning et al., "Compression and Explanation Using Hierarchical Grammars", *The Computer Journal*, vol. 40, No. 2/3, 1997, pp. 103-116.
Larus, "Whole Program Paths", *ACM SIGPLAN Notices*, vol. 34, No. 5, Atlanta, GA, May 1999, pp. 259-269.
Chilimbi et al., "Making Pointer-Based Data Structures Cache Conscious", *Computer*, vol. 33, No. 12, Dec. 2000, pp. 67-74.
Chilimbi, "Efficient Representations and Abstractions for Quantifying and Exploiting Data Reference Locality", *ACM SIGPLAN Notices*, vol. 36, No. 5, Snowbird, UT, Jun. 2001, pp. 191-202.
Chilimbi, "On the Stability of Temporal Data Reference Profiles", *International Conference on Parallel Architectures & Compilation Techniques*, Barcelona, Spain, Sep. 2001, pp. 151-160.

* cited by examiner

*Primary Examiner*—Antony Nguyen-Ba
(74) *Attorney, Agent, or Firm*—Merchant & Gould; Ryan T. Grace

(57) ABSTRACT

A system and method for analyzing data accesses to determine data access patterns. Data address accesses are traced and transformed into Whole Program Streams (WPS). WPS may then be used to discover higher-level data abstractions, such as hot data streams and data flow graphs. Hot data streams provide information related to sequences of data addresses that are repeatedly accessed together. Data flow graphs indicate how hot data streams are related and include frequencies of each hot data stream following another. Hot data streams and data flow graphs may be used with prefetching and/or cache managers to improve program performance.

22 Claims, 12 Drawing Sheets

SYSTEM AND METHOD FOR ANALYZING DATA ACCESSES OF A TRACE FROM A COMPUTER-EXECUTABLE PROGRAM TO DETERMINE DATA ACCESS PATTERNS

FIELD OF THE INVENTION

The present invention relates generally to computer-executable software applications and, more particularly, to improving the performance of computer-executable software applications.

BACKGROUND

As processor speeds continue to increase, memories providing data to the processor have become more and more of a bottleneck. In an effort to speed memory access, high speed caches were created to deliver data to processors. Generally, a cache only stores a fraction of the data stored in main memory. A cache "hit" occurs when the cache contains data the processor is requesting. A cache "miss" occurs when the cache does not contain data the processor is requesting. When a cache miss occurs, the data must be retrieved from main memory or disk. The time to fetch the data when a cache miss occurs, even from main memory, can be much greater than when a cache hit occurs. Increasing the percentage of cache hits and decreasing the number of cache misses, therefore, increases the overall performance of a computer system.

One approach to improving cache hits is to collect and analyze the data accesses of an executing program. A problem with this approach has been the amount of data accesses that an executing program generates even for a relatively short run time.

SUMMARY

The present invention provides a system and method for analyzing data accesses of a trace from a computer-executable program to determine data access patterns (also called data access sequences). Data address accesses of a software program are traced and transformed into Whole Program Streams (WPS). WPS are small compared to the raw data address traces and permit analysis without decompression. The WPS can then be used to efficiently discover higher-level data abstractions, such as hot data streams. Hot data streams may be viewed as frequently repeated sequences of consecutive data accesses. They serve as an effective abstraction for understanding and analyzing a program's dynamic data access behavior as well as exposing reference locality in a data address stream.

In one aspect, after hot data streams are discovered, they may be used to reduce (or compress) a trace even further. For example, non-hot data streams (also known as less frequently occurring data access sequences) may be removed from the trace to form a modified trace that may then be transformed again into another WPS. In addition, hot data streams may be used to form stream flow graphs which show how hot data streams are related. That is, stream flow graphs may be used to determine the frequency with which one hot data stream follows another. Furthermore, stream flow graphs may be very compact compared to an original trace file. For example, in some instances information from a one hundred gigabyte trace file may be transformed into a one megabyte or smaller stream flow graph representing hot data streams from the trace.

In another aspect of the invention, the hot data streams may be identified from a trace by constructing a grammar representing the data access sequences of the trace. The grammar itself forms a compact representation of a program's data access patterns. A sequence of data accesses may be extracted from the grammar without decompressing the grammar. When the cost of accessing the data elements in an extracted sequence exceeds a selectable threshold, the extracted sequence may be marked as hot to indicate that it is a repetitively occurring data access sequence. Determining the cost of accessing the data elements in an extracted sequence may include multiplying the number of times the sequence is found in the trace by the number of data accesses occurring within the extracted sequence.

In various aspects of the invention, the trace file being analyzed may come from a currently executing program or an archived file created earlier. Analysis may occur either on the same computer that is executing the program and generating data accesses or on another computer.

In another aspect of the invention, information generated by analysis of the trace may be used to pre-fetch data into random access memory (RAM), cache, or some other computer-readable medium. Pre-fetching the data generally speeds access to it later.

In another aspect of the invention, information generated by analysis of the trace may be used in placing or locating data within a cache so that cache conflicts are avoided or so that the data is otherwise optimized for the characteristics of the cache.

In another aspect of the invention a system including data access sequences and stream flow graphs, pre-fetches data from a hot data stream that will likely follow the currently accessed hot data stream. This may occur when it is determined that one hot data stream dominates a set of following hot data streams.

There are several advantages to the present invention, some of which follow. For example, it is not required to rely on system architecture to provide useful information. In other words, the invention can be practiced on various types of computers and operating systems, including personal computers, hand-held devices, multiprocessor systems, microprocessor-based or programmable consumer electronics, network PCs, minicomputers, mainframe computers, and the like. Aspects of the invention may be used to increase cache hits and memory performance with static tools such as compilers or dynamically as a program executes. Additionally, aspects of the invention provide an efficient and useful way to represent large, hard to manage data access traces that would otherwise occupy gigabytes of storage.

DETAILED DESCRIPTION

Figure 1:
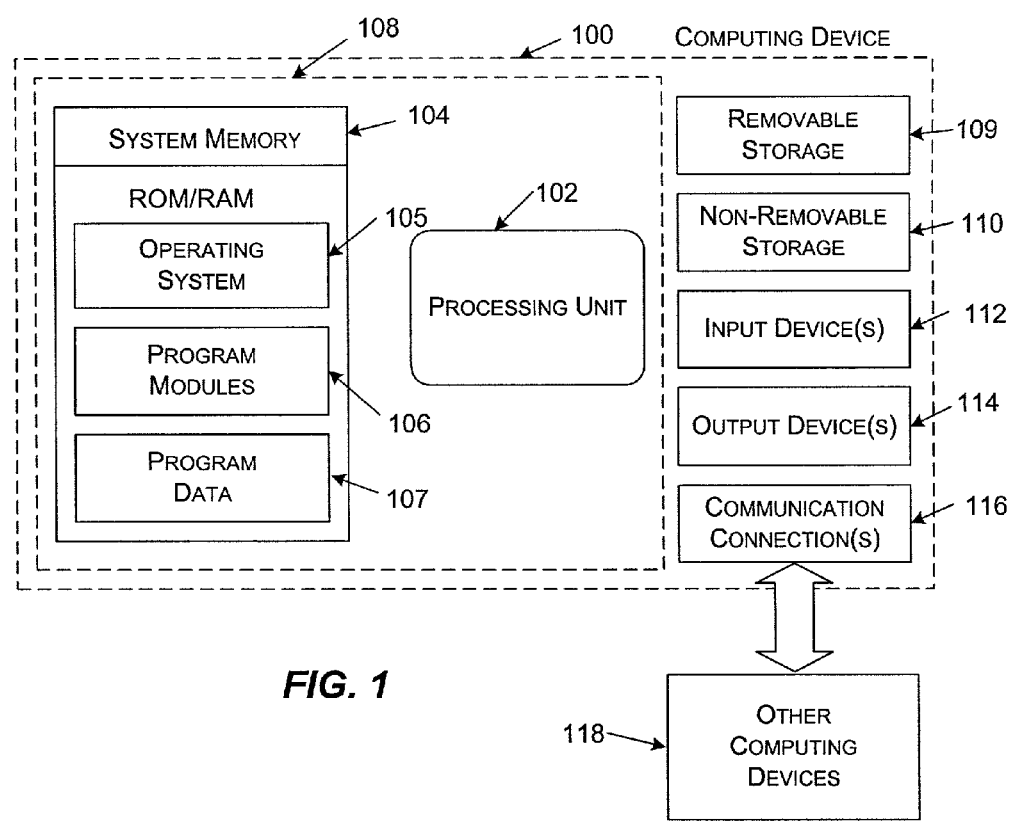
FIG. 1 is a functional block diagram of one computing device adapted to implement an embodiment of the invention.

With reference to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

Figure 2:
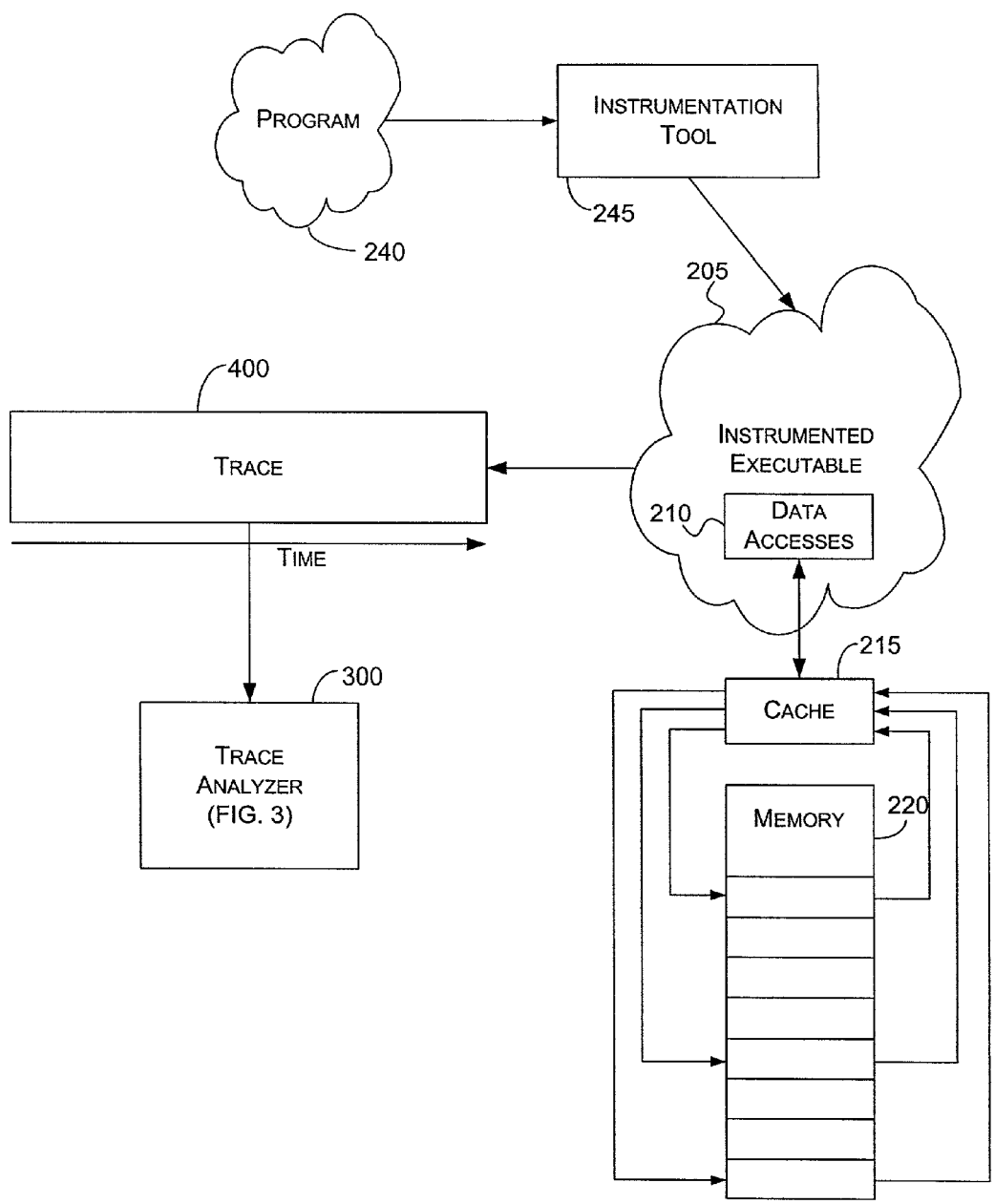
FIG. 2 is a functional block diagram illustrating a system adapted to collect and analyze information about the data accesses of an executable program.

FIG. 2 is a functional block diagram illustrating a system adapted to collect and analyze information about the data accesses of an executable program, according to one embodiment of the invention. Program 240 includes a computer-executable program. It may include source code or binary code suitable for execution on a computer.

Instrumentation tool 245 is configured to receive the instructions of program 240 and instrument program 240 based on the instructions received. Instrumentation tool 245 may be located on the same computer as program 240, or it may be located on a computer networked to the computer containing program 240. If instrumentation tool 245 is on the same computer as program 240, instrumentation tool 245 may be configured to read the instructions of program 240 from RAM, disk, or some other computer-readable memory accessible by the computer on which instrumentation tool 245 resides.

Instrumentation tool 245 may instrument program 240 before, during, or after compilation. In one embodiment, before compilation, instrumentation tool 245 adds source code to program 240 to output trace information as program 240 executes particular instructions.

In another embodiment, instrumentation tool 245 instruments program 240 during compilation. Instrumentation tool 245 may be included in a compiler compiling program 240. At appropriate points, the compiler calls instrumentation tool 245 to insert instrumenting code into the binary executable that the compiler is creating from program 240. Alternatively, instrumentation tool 245 may be a separate program called by the compiler as the compiler compiles program 240. In light of this disclosure, those skilled in the art will recognize that instrumentation tool 245 could be used with a compiler in many different ways to instrument program 240 during compilation without departing from the spirit or scope of this invention.

In yet another embodiment, instrumentation tool 245 instruments a binary executable of program 240. In this embodiment, instrumentation tool 245 inserts code into the binary executable to output trace information while the binary executes.

In yet another embodiment, instrumentation tool 245 attaches to and dynamically instruments a binary executable of program 240, while the binary is executing.

Program 240 may be written for an interpreter to execute. Generally, interpreters do not require a binary in order to execute the instructions of a program. In one embodiment, instrumentation tool 245 instruments program 240 by adding instrumenting code before an interpreter executes program 240.

In another embodiment, the interpreter executing program 240 is modified to include instrumentation tool 245 such that instrumentation tool is called when program 240 executes particular instructions. Then instrumentation tool 245 outputs trace information related to the instructions. In other words, program 240 would not need code added to produce a trace. Instead, the interpreter may recognize instructions that instrumentation tool 245 traces and calls instrumentation tool 245 when these instructions are executed.

When code is instrumented, predefined actions occur upon particular program behavior. For example, program 240 may be instrumented to write data to a data file whenever certain memory is written to or read from. As another example, program 240 may be instrumented to produce a trace of instructions executed. In the embodiment of the invention shown in FIG. 2, program 240 is instrumented to generate a trace relating to data accesses performed by program 240.

The result of inserting instrumenting code into program 240 is an instrumented executable, such as instrumented executable 205. Whenever data is accessed as represented by data accesses 210, the instrumentation code within instrumented executable 205 generates trace information to be stored by trace component 400. Alternatively, in the case of some interpreted code, the result is an interpreter modified to execute program 240 that generates trace information as if program 240 had been instrumented.

Data accesses 210 within instrumented executable 205 represent data access requests made by instrumented executable 205. Such requests are generally sent to cache 215. Cache 215 provides high speed access to data that has been retrieved or written to previously. Generally, a cache is smaller than memory 220, so typically, cache 215, even when fully utilized, may only contains a fraction of memory 220. A request for data that is not in cache 215 causes a request to be sent to memory 220 for the data. When memory 220 responds with the data, the data is returned to the requesting entity and stored in cache 215. As long as new data does not overwrite the data in cache 215, future requests for the same data are typically fulfilled much quicker than if the data is retrieved from memory 220.

A request for data not contained in cache 215 which is satisfied from memory 220 may take two or more orders of magnitude longer than a data request satisfied from cache 215.

An embodiment of trace component 400 is described in greater detail in conjunction with FIG. 4 as described below. Briefly described, trace component 400 is configured to receive trace information and store the trace information for future access. The trace information may be stored in memory, on disk, or in other computer-readable media. Furthermore, a trace received by trace component 400 may be stored on the same computer system in which instrumented executable 205 executes, or it may be stored on a computer system communicating with the computer system upon which instrumented executable 205 executes.

In one embodiment of the invention, trace component 400 receives trace information from instrumented executable 205. In another embodiment of the invention, trace component 400 receives trace information from another source such as disk, memory, or another computer system. Being able to receive trace information from other sources allows trace component 400 to store previous traces which can then be analyzed. In other words, trace component 400 is not limited to receiving trace information from an executing instrumented executable. As long as the trace information is in a form appropriate for trace component 400 to receive, it does not matter where the trace information comes from.

Trace analyzer 300 is configured to receive a sequence of elements of a trace from trace component 400 and to analyze the sequence received. Additionally, trace analyzer may update data structures indicating the frequency and relationship among sequences of elements. Trace analyzer 300 is described in more detail below in conjunction with FIG. 3.

Figure 3:
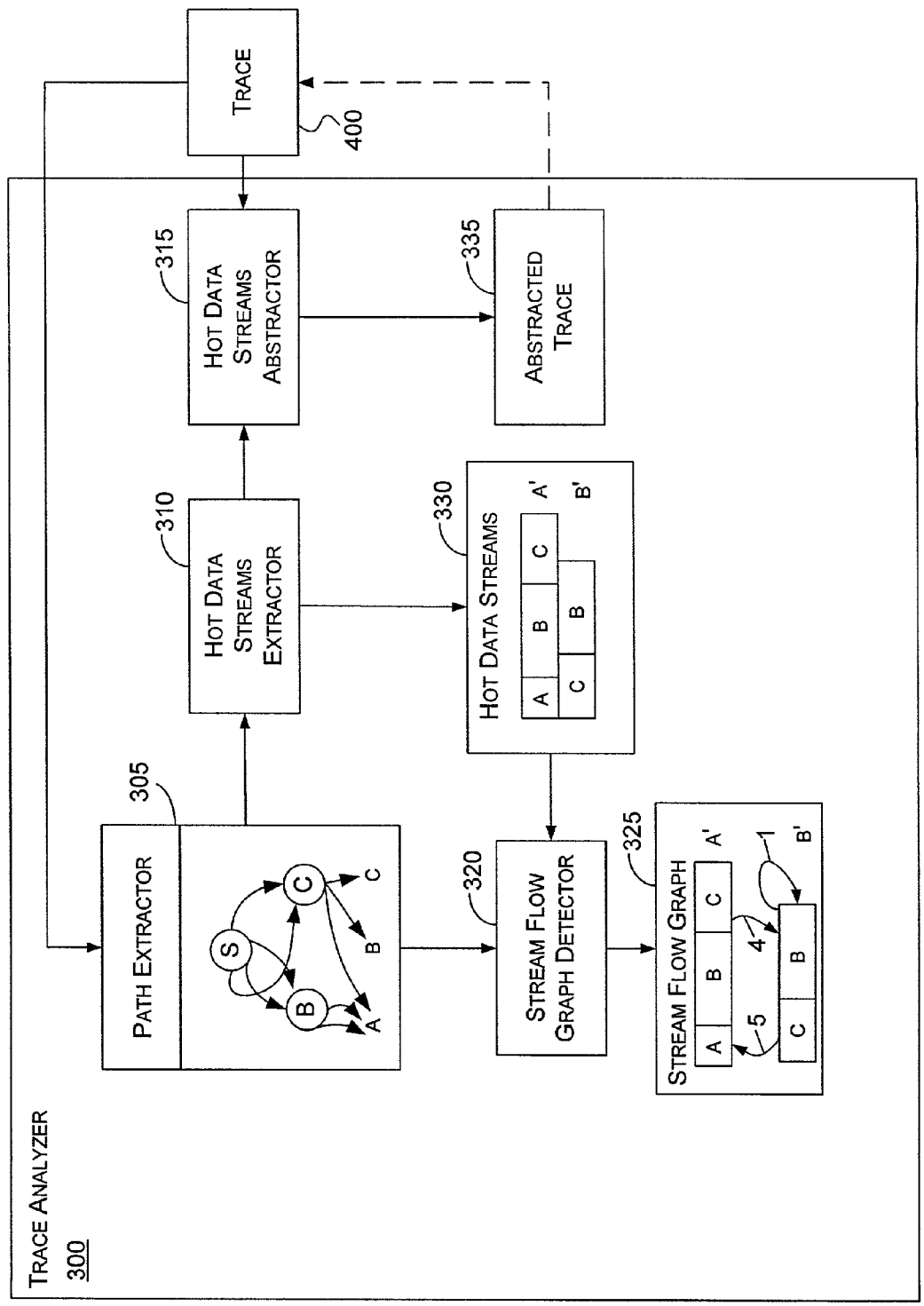
FIG. 3 is a functional block diagram illustrating a system for extracting and analyzing information from a trace of data accesses.

FIG. 3 is a functional block diagram illustrating a system for extracting and analyzing information from a trace of data accesses, according to one embodiment of the invention. The system includes path extractor 305, hot data streams extractor 310, hot data streams abstractor 315, stream flow graph detector 320, stream flow graph 325, hot data streams 330, and abstracted trace 335.

Hot data streams extractor 310 is coupled to path extractor 305, hot data streams abstractor 315, and creates hot data streams 330. Stream flow graph detector 320 is coupled to path extractor 305 and uses hot data streams 330 to create stream flow graph 325. Trace component 400 is coupled to path extractor 305, hot data streams abstractor 315, and may receive a modified trace from abstracted trace 335. Hot data streams abstractor 315 may generate abstracted trace 335.

Path extractor 305 is configured to receive a trace from trace component 400, to transform the trace received into Whole Program Streams (WPS), and to send the WPS to hot data streams extractor 310 and possible stream flow graph detector 320. In one embodiment of the invention, path extractor 305 receives the trace after several data accesses have been stored in trace component 400 and then constructs WPS. In another embodiment of the invention, path extractor 305 receives the data accesses as they are generated and constructs WPS while instrumented executable 205 executes. Path extractor 305 may form WPS by constructing a context free grammar. The grammar includes rules for generating sequences of data accesses corresponding to the data access sequences in the trace received from trace component 400. The grammar may be represented as a Directed Acyclic Graph (DAG) as shown within path extractor 305.

By transforming the trace received from trace component 400 to WPS, path extractor 305 typically reduces the amount of data needed to represent a trace. A trace received by trace component 400 may consume gigabytes of storage, even for a relatively short execution of instrumented executable 205. For example, the inventors have noticed that, in actual use, 252.eon, a SPECint 2000 benchmark, generated a trace of 2.6 gigabytes in 60 seconds of run time. In one actual implementation, path extractor 305 compressed the 252.eon trace to less than 6 megabytes giving a 456 to 1 compression ratio. As will be discussed later, path extractor 305 may also operate on a trace generated by hot data streams abstractor 315. When it does so, it may compress the generated trace even more.

In transforming the trace from trace component 400, path extractor 305 may eliminate redundant or unnecessary information to reduce the amount of data to that which is pertinent for analyzing program 240's data access patterns. Path extractor 305, for example, may eliminate stack references. Stack references are typically located closely together in memory. Because of the locality of stack references, data accesses to one element in a stack typically cause other elements in the stack to be retrieved as well. Thus, optimizing sequences of stack references further does not generally yield as much improvement as optimizing other data access sequences. For this reason, and to reduce the size of data to be analyzed, stack references, may be eliminated in the trace received from trace component 400.

Figure 4:
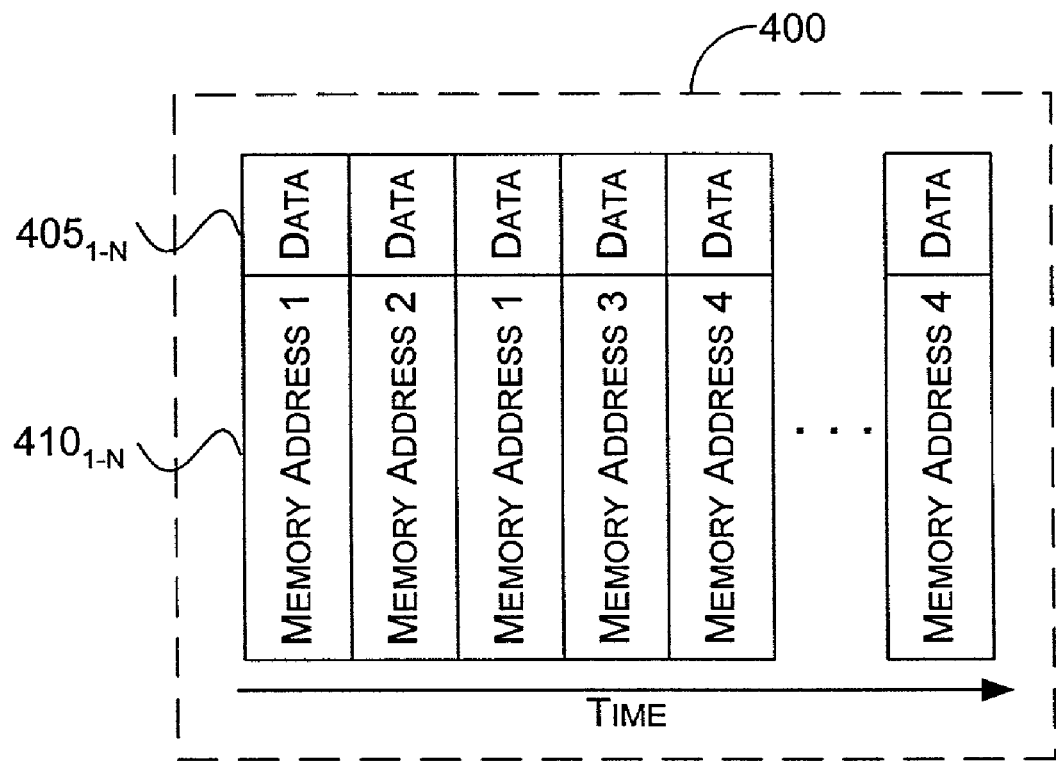
FIG. 4 illustrates components of a sample trace.
Figure 8:
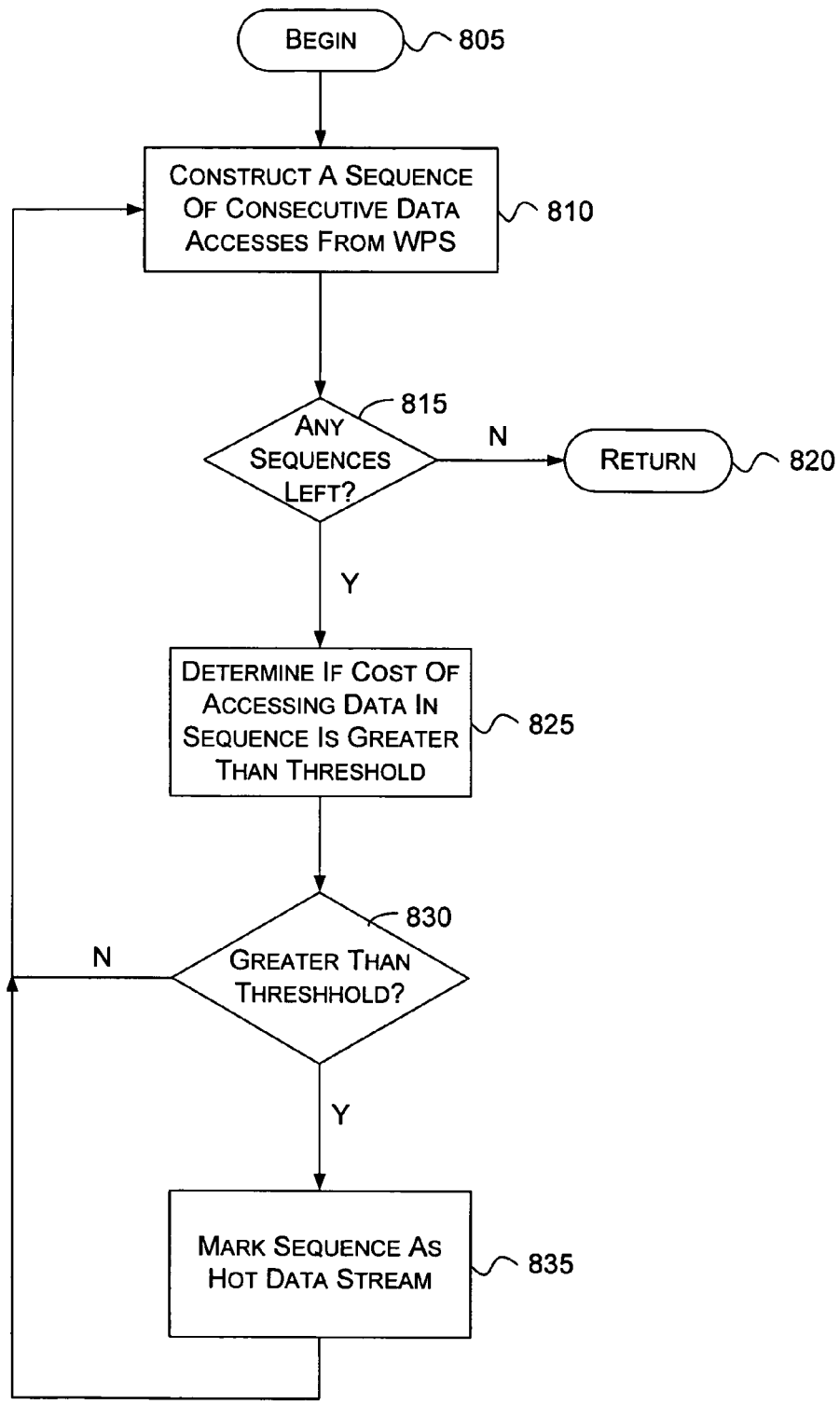
FIG. 8 is a logical flow diagram illustrating a process for determining hot data streams.

In addition, path extractor 305 may transform related data addresses to make the data access sequence easier to analyze, more compressible, and/or for other reasons discussed in conjunction with FIGS. 4 and 8.

Hot data streams extractor 310 is configured to receive a WPS from path extractor 305. Hot data streams extractor 310 analyzes the WPS to discover hot data streams 330. Discovered hot data streams 330 may then be used for further analysis.

A hot data stream is a frequently repeated sequence of consecutive data references. Stated more formally, a hot data stream is a sequence of R or fewer consecutive data references that incur a cost of C or more, where C is formed from the product of the number of references in the data stream and the frequency with which the stream occurs. For example, a sequence of consecutive data references that includes only ten references and repeats only once has a lower cost than a sequence of consecutive data references that includes only two references and repeats six times. Hot data streams may be used to improve cache and memory performance.

Hot data streams 330 may be sent to stream flow graph detector 320 and/or hot data streams abstractor 315. Stream flow graph detector 320 may use the WPS created by path extractor 305 in conjunction with hot data streams 330 to create stream flow graph 325. A stream flow graph shows the number of times in a trace each hot data stream immediately follows another hot data stream, when intervening cold references are ignored. For example, in stream flow graph 325, the hot data stream designated by B' follows the hot data stream designated by A' 4 times and follows itself once. In addition, the hot data stream represented by A' follows the hot data stream represented by B' 5 times.

The following example illustrates this in a relatively simple WPS. Assume a WPS of CB ABC EF CB ABC FF CB ABC CB ABC CB D CB ABC (where spacing is added for readability and hot data streams are shown in bold). ABC directly follows CB 5 times and CB directly follows ABC 4 times, and itself once (ignoring cold references). In some senses, stream flow graphs may be thought of as control flow graphs for data accesses. In a more complicated stream flow graphs, many hot data streams may be interconnected by edges showing how often each hot data stream follows another.

Such stream flow graphs may be used in improving program performance. For example, the number of times a particular hot data stream follows another may be converted into a probability of the hot data stream following the other. When this probability is high, some time after the hot data stream is encountered, the other hot data stream may be pre-fetched so that it is available when the program needs it. This may be used to avoid a cache miss and its associated latency.

Stream flow graph detector 320 may use the WPS extracted by path extractor 305 to determine whether one hot data stream immediately follows another. This may be done because the WPS includes information necessary to reconstruct the given trace and thus in combination with a list of hot data streams may be used to determine the number of times each hot data stream immediately follows another.

In some embodiments of the invention, stream flow graph detector is continually receiving hot data streams and WPS. That is, each time an instrumented program generates a new data address, it is inputted into path extractor 305 which sends it to stream flow graph detector 320. Stream flow graph detector 320 uses the data address to update stream flow graph 325 in real time as the program executes. Because of the relatively low memory requirements for storing stream flow graphs, this may use a negligible amount of memory. At the same time, however, the information contained in the dynamically updated stream flow graph may be used to increase performance by pre-fetching (as previously discussed), or through other ways.

Hot data streams abstractor 315 receives hot data streams from hot data streams extractor 310. It uses the hot data streams together with the trace from trace component 400 to remove cold data streams from a trace. The remaining hot data streams may then be abstracted and stored in abstracted trace 335. Abstracting the remaining hot data streams may mean replacing a hot data stream, such as ABC, with a single reference, such as A', that represents the hot data stream.

After hot data streams have been abstracted into abstracted trace 335, they may be inputted into trace component 400 which may then be used again by trace analyzer 300. With each iteration, the amount of information required for storing the WPS and the stream flow graphs generally decreases. At the same time, information regarding the exact sequence of data accesses is lost as the cold data streams are removed from the trace. Through this method, hundreds of gigabytes of trace information may be reduced to one megabyte or a few hundred kilobytes.

FIG. 4 illustrates components of a sample trace, according to one embodiment of the invention. The trace stored in trace component 400 includes a sequence of memory addresses $410_{1-N}$ and data elements $405_{1-N}$. In one embodiment of the invention, the sequence is in chronological order. The trace stored in trace component 400 may include less than all data access references a program generates. For example, some data references such as stack references and other data references may not be included in the trace stored in trace component 400. This would happen, for example, if program 240 were instrumented such that it did not output trace information when such a reference occurred.

A trace entry includes at least a memory address and may also include a data element. Each memory addresses in the trace stored in trace component 400 may be an actual memory address referenced by a program or it may be a different memory address or identifier related to the memory address accessed by the program. For example, a heap object may be accessed using several different memory addresses. The heap object may include an array of data elements which are each accessed individually. Without mapping such accesses to a unique identifier identifying the heap object, such accesses might appear to be accesses to several different data objects. For this reason and reasons discussed in conjunction with FIG. 7, references to data elements within the same heap object may be mapped to a unique identifier identifying the heap object.

To be able to map different related heap addresses to a unique heap object, it may be necessary to collect information about allocations and deallocations of heap objects. The information may include the allocation/deallocation program counter, the start address of the allocated/freed memory, the size of the allocated/freed memory, a global counter that uniquely identifies a particular allocation/deallocation, the last three functions on the call stack, and other data. In one embodiment of the invention, the information is maintained in an auxiliary trace with indexes to indicate where in the data reference trace the allocations and deallocations occur. In another embodiment of the invention, the information is interleaved with the data addresses in a single trace.

In addition, as the heap is often reused for various objects, a global counter may be incremented and combined with a heap reference to create a unique identifier to an object found on the heap. This identifier may be used to distinguish heap memory references that are identical but refer to different objects. In other words, even if a heap reference were later found in a program that accessed a previously accessed memory location, the identifier may be used to determine whether the reference is to a previously referenced object or a new object.

Data elements $405_{1-N}$ may include data such as a time stamp, a program counter value, a reference type, e.g. stack reference, heap reference, global reference, program call stack, etc., an identifier uniquely identifying a heap allocation, information identifying a thread accessing the data, or other information useful for later analysis.

Figure 5:
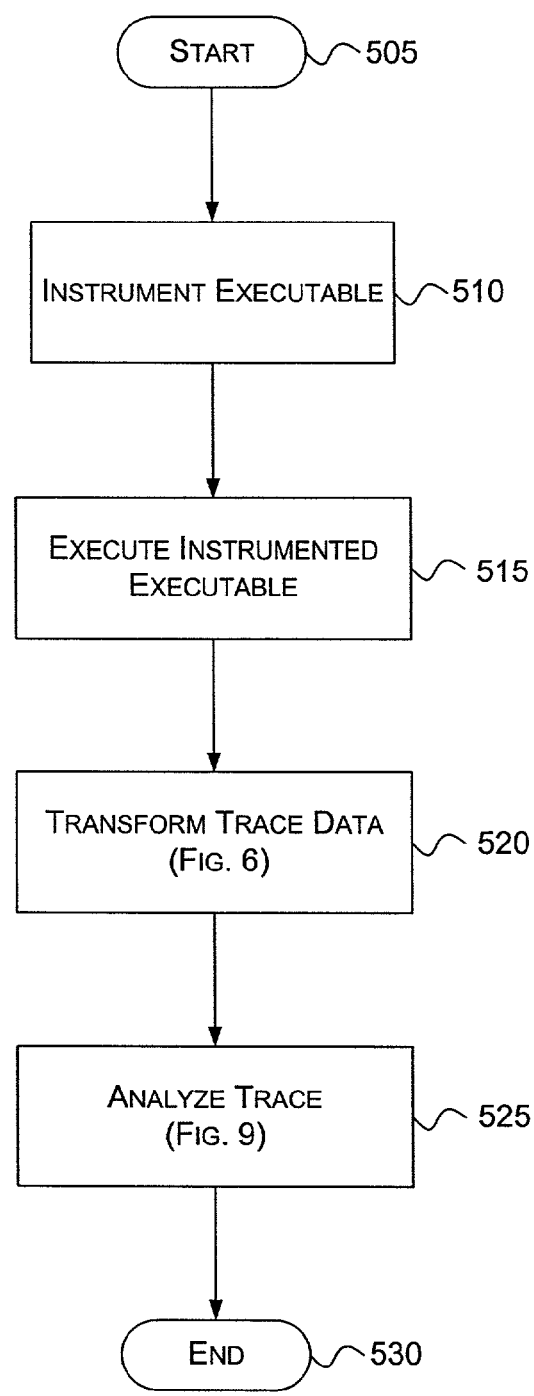
FIG. 5 is a logical flow diagram illustrating a process for creating and analyzing a trace file.

FIG. 5 is a logical flow diagram illustrating a process for creating and analyzing a trace file, according to one embodiment of the invention. The process begins at block 505 when a user desires to discover data access patterns in an executable program. For example, referring to FIG. 2, a user may wish to discover any hot data streams occurring as a result of executable program 240's data accesses.

At block 510, an executable program is instrumented to output data access information. For example, referring to FIG. 2, instrumentation tool 245 inserts instrumentation code into executable program 240. The instrumentation code is designed to output data accesses performed by the executable program 240. After instrumenting code has been inserted into the executable program, processing continues at block 515.

At block 515, the instrumented executable program is executed. While the instrumented executable program executes, the instrumentation code within the instrumented executable program outputs a data access sequence of the executable program. The data access sequence is stored in a trace in RAM, on disk, or in some other computer-readable media. For example, referring to FIG. 2, as instrumented executable 205 executes, the data access sequences of executable program 240 are stored in trace component 400.

At block 520, the trace may be transformed to remove unnecessary data access references and to modify other data access references to improve compressibility of the trace. Briefly described, stack references may be removed and heap references may be modified. This is described in more detail in conjunction with FIG. 6. For example, referring to FIG. 3, path extractor 305 receives a trace from trace component 400 and may modify heap references and remove stack references.

Figure 7:
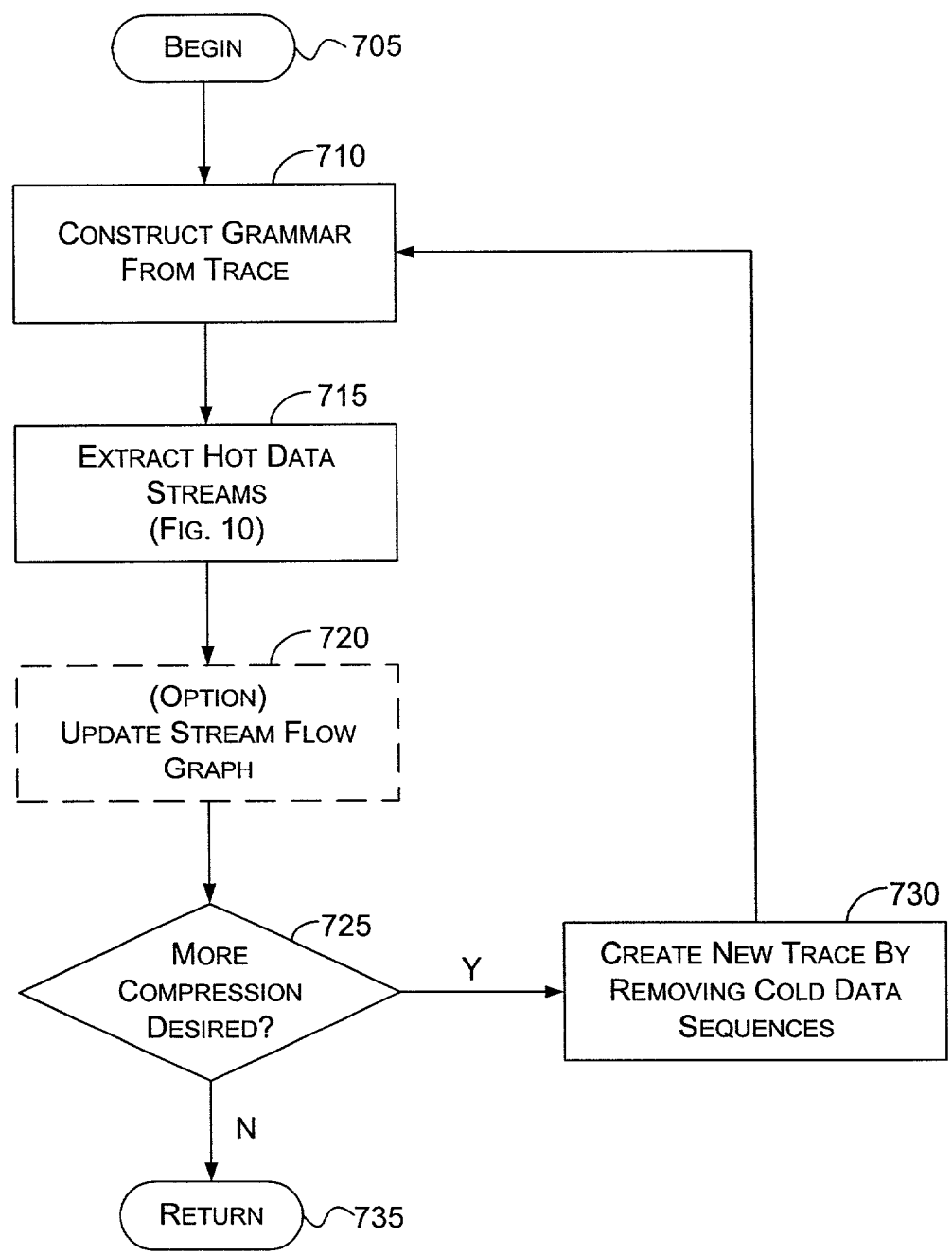
FIG. 7 is a logical flow diagram illustrating a process for analyzing and optionally compressing even further a trace.

At block 525, the trace is analyzed as described in more detail in conjunction with FIG. 7. Briefly, a grammar is extracted representing the trace, hot data streams are extracted, and a stream flow graph may be updated. The trace may then be further compressed by removing cold data streams and repeating the above process.

In another embodiment of the invention, the trace generated at block 515 does not include all data accesses. For example, stack references may not be recorded in the trace file. This could be accomplished by instrumenting the executable program such that no output is generated when the executable program accesses a stack data reference. In this embodiment of the invention, removing stack references at block 520 is not necessary.

In another embodiment of the invention, the heap references in the trace generated at block 515 may be transformed to a more compressible state before the process reaches block 520. This could be accomplished by instrumenting the executable program such that heap references are transformed as described in more detail in conjunction with FIG. 6. In this embodiment of the invention, transforming heap references at block 520 is not necessary.

Figure 6:
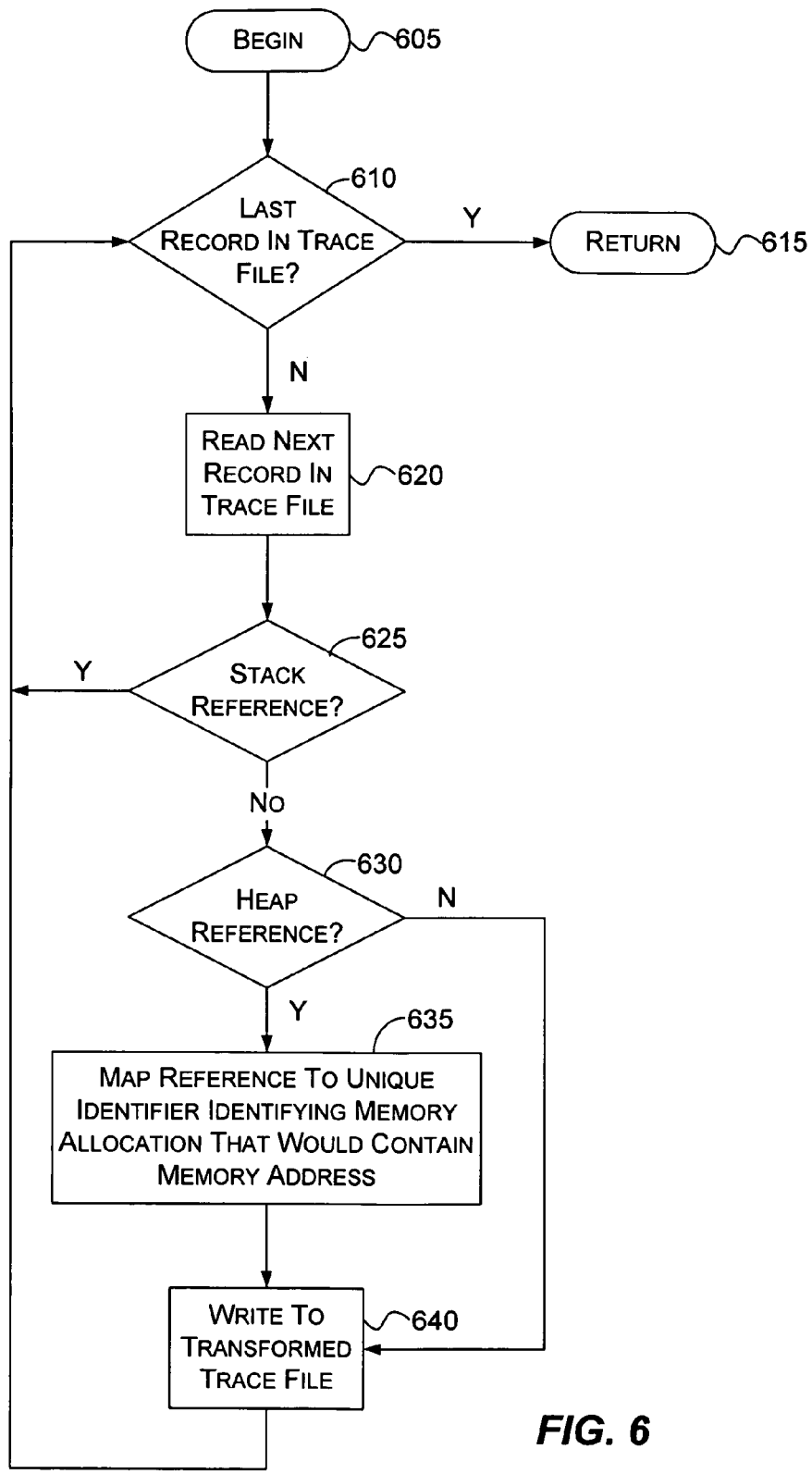
FIG. 6 is a logical flow diagram illustrating a process for transforming a data accesses trace file into a more compact form.

In another embodiment of the invention, instrumentation tool 245 instruments the executable such that stack references are omitted from the trace file and heap references are transformed in a manner similar to that described in conjunction with FIG. 6. This could be accomplished by instrumenting the executable appropriately. In this embodiment of the invention, block 520 is not necessary and processing flows directly from block 515 to block 525.

At block 530, processing ends. At this point, an executable has been instrumented and executed. In executing it has generated a trace file that may then be transformed to remove certain references and transform other references. Finally, the transformed trace file has been analyzed to find hot data streams.

FIG. 6 is a logical flow diagram illustrating a process for transforming a data accesses trace file into a more compact form, according to one embodiment of the invention. The process begins at block 605 after a trace is available for transformation.

At block 610, if there are no more records to be processed in the trace file, processing branches to block 615; otherwise, processing branches to block 620.

At block 620, a record is read from the trace file. In one embodiment of the invention, the next record in the trace file is read from disk. In another embodiment of the invention, the next record is read directly from memory. In yet another embodiment of the invention, the next data access record is obtained from a program that is currently executing.

At block 625, a determination is made as to whether the next record in the trace file is a stack reference or not. If the next record in the trace file is a stack reference, processing branches to block 610. If the next record in the trace file is not a stack reference, processing branches to block 630.

At block 630, a determination is made whether the next record in the trace file is a heap reference. If the record in the trace file is a heap reference, processing branches to block 635. If the record in the trace file is not a heap reference, processing branches to block 640.

At block 635, a heap reference is mapped to a unique identifier identifying the memory allocation containing the memory address of the heap reference. For example, a program may request a block of memory from the heap during program execution. Such a memory request might be used for an array of data elements. Subsequently, the program may use the array for various operations and calculations. At block 635, each data access reference to the array is mapped to a single identifier identifying the memory block.

Mapping each data access to data within a block to the same identifier has several advantages. One advantage is that it greatly increases the compressibility of the data access pattern. This occurs because a series of accesses to data within the memory block is no longer treated as a series of accesses to multiple addresses; rather, it is treated as a series of accesses to a single identifier. This makes the data access sequence more repetitive. Typically, the more repetitive a sequence is, the more compressible it is.

Another advantage to mapping each data access to data within a block to the same identifier is that it simplifies analysis of a data access sequence. Specifically, instead of analyzing the sequence within the block, an analyzer can focus on a sequence of blocks accessed. Typically, information about the sequence of blocks accessed is more important to improving cache and memory performance than information about the sequence of memory addresses accessed within a block. This is true because generally a memory block allocation allocates contiguous memory. Data located in contiguous memory is typically placed on the same memory page or on contiguous memory pages.

Because many memory managers retrieve and flush pages of memory to disk in one operation, access to a data element within a block typically causes all or a substantial portion of the data in the block to be retrieved into main memory at one time. Consequently, other accesses to data in the block typically incur no extra retrieval time.

Accesses to data elements in different blocks, on the other hand, often do cause extra retrieval time. This occurs because blocks obtained by memory allocations are typically scattered in memory or on disk. While accessing a data element in one block often causes the rest of the block to be retrieved into memory, accessing a data element in one block does not typically cause the next needed data block to be retrieved into memory. But a memory manager aware of sequences of data blocks that will be requested or allocated by a program could place the data blocks in close proximity and possibly on the same memory page. Alternatively, it could pre-fetch pages containing data blocks soon to be accessed as described in conjunction with FIG. 9.

By mapping each reference to a memory address in a block of memory to a unique identifier, some information is lost. Specifically, rebuilding the exact data access sequence from the mapped representation may no longer be possible. However, as stated above, being able to rebuild the exact data access sequence within a block is not generally required to improve memory and cache performance.

At block 640, transformed data is written to a transformed trace file. The transformed trace file may be in RAM or on some other computer-readable media such as a disk. The transformed trace file may then be used for finding hot data streams.

After block 640, processing continues at block 610 to determine if there are any more records in the trace file to be transformed, and the process may repeat until no more records remain.

At block 615, the process returns to the calling process. At this point, stack references have been removed and heap references have been transformed. Trace analysis may now be performed.

FIG. 7 is a logical flow diagram illustrating a process for analyzing and optionally compressing even further a trace, according to one embodiment of the invention. The process begins at block 705 after a trace is available for processing.

At block 710, a grammar is constructed representing the data accesses of the trace file. The grammar is also known as WPS and represents the data accesses the executable program performs. The grammar may be represented as a directed acyclic graph (DAG). The grammar generates a string, which is the input sequence of data accesses. The data access trace can be regenerated by traversing the DAG in postorder. The DAG representation of the grammar permits efficient analysis and detection of hot data streams. For example, referring to FIG. 3, path extractor 305 constructs a grammar from the trace file. An example of a DAG is seen within path extractor 305.

An algorithm that may be used to implement block 710 according to one embodiment of the invention is the SEQUITUR algorithm. For information regarding the SEQUITUR algorithm, see C. F. Nevill-Manning and I. H. Witten, "Compression and explanation using hierarchical grammars," The Computer Journal, vol. 40, pp. 103–116, 1997. Another algorithm that may be used to implement block 710 according to another embodiment of the invention is a modification of the SEQUITUR by James R. Larus. For this modification, see James R. Larus, "Whole program paths," Proceedings of the ACM SIGPLAN'99 Conference on Programming Language Design and Implementation, pp. 259–269, May 1999. Other hierarchical grammar construction algorithms may be used to implement block 710 in other embodiments of the invention.

At block 715, the grammar is used to discover hot data streams. Briefly described, the grammar is examined for patterns of frequently repeated data access sequences. Data sequences frequently repeated are marked as hot if the product of the number of repetitions and the length of the sequence exceeds a selectable threshold. Discovering hot data streams is described in more detail in conjunction with FIG. 8. For example, referring to FIG. 3, hot data streams extractor 310 uses the grammar constructed by path extractor 305 to discover hot data streams.

At block 720, a stream flow graph may be updated. For example, an edge of stream flow graph 325 of FIG. 3 may be incremented to account for one hot data stream, such as A', following another hot data stream, such as B'. Alternatively, a new hot data stream may be added to the stream flow graph, with an edge to it from the hot data stream that was last accessed.

At block 725, a determination is made as to whether more compression (or abstraction) of the trace is desired. If so, processing branches to block 730; otherwise processing branches to block 735. For example, in a multi-gigabyte trace file, one pass through the process shown in FIG. 7, may not compress a trace sufficiently for it to be used effectively.

At block 730, a new trace is created, in part, by removing cold data sequences. In addition, each hot data stream may be replaced with a symbol representing it. For example, referring to FIG. 3, the hot data sequence ABC may be replaced with A'. A table may also be constructed that associates each symbol with the hot data stream it represents, so that a data stream may be reconstructed. The trace created at block 730 then be used in another iteration of the process shown in FIG. 7.

At block 735, the process returns to the calling process. At this point, hot data streams have been extracted through one or more iterations of trace analysis. These hot data streams may then be used to improve performance as described in conjunction with FIGS. 9–12.

FIG. 8 is a logical flow diagram illustrating a process for determining hot data streams, according to one embodiment of the invention. The process begins at block 805 after a WPS has been created.

At block 810, a sequence of consecutive data accesses is constructed from the WPS. In one embodiment of the invention, the sequence is constructed by postorder traversal of the DAG representing the WPS, where each node is visited once. In this embodiment, at each interior node, the consecutive data access sequences are constructed by concatenating data access sequences in substreams produced by two or more of the node's descendants.

In another embodiment of the invention, at block 810, construction of a sequence starts with a small sequence of data accesses that has not already been determined to be a hot data stream. Addition of sequences to the beginning or end of the sequence continues until the sequence constitutes a hot data stream. In this way, minimal hot data streams may be constructed. A minimal hot data stream is a sequence of data accesses which incurs a cost greater than or equal to C, but incurs a cost less than C when any part of the sequence is removed from the beginning or end of the data accesses sequence. C is the threshold cost a data access sequence must incur to be considered a hot data stream. Minimal hot data streams are useful since all non-minimal hot data streams are formed by adding a data access sequence to the beginning or end of a minimal hot data stream.

At block 815, the existence of a sequence is tested. If no sequence was constructed, processing branches to block 820, where the process returns to a calling process. If a sequence was constructed, processing branches to block 825.

At block 825, a determination is made as to whether the cost of accessing data in the sequence is greater than a threshold. Cost is the product of the number of references in the data sequence multiplied by the number of times the data access sequence is repeated. Preferably, the threshold may be set such that the hot data streams resulting cover 90% of the data accesses of the entire trace. Setting such a threshold is often an iterative process because one generally does not know how low or high to set the threshold to cover 90% of the data accesses without experimentation.

At block 830, a determination is made as to whether the cost of accessing the sequence is greater than the threshold. If the cost is not greater than the threshold, processing branches to block 810. If the cost is greater than the threshold, processing branches to block 835.

At block 835, the data access sequence is marked as being a hot data stream. Then, process flow continues at block 810, until no sequences remain at decision block 815. At that point, hot data streams in the DAG have been identified and can be used for further analysis or program optimization.

Illustrative System Utilizing Hot Data Streams and/or Stream Flow Graphs

The previous discussion relates to the discovery of hot data streams and stream flow graphs. The discussion below relates to how these may be used to increase program performance.

Figure 9:
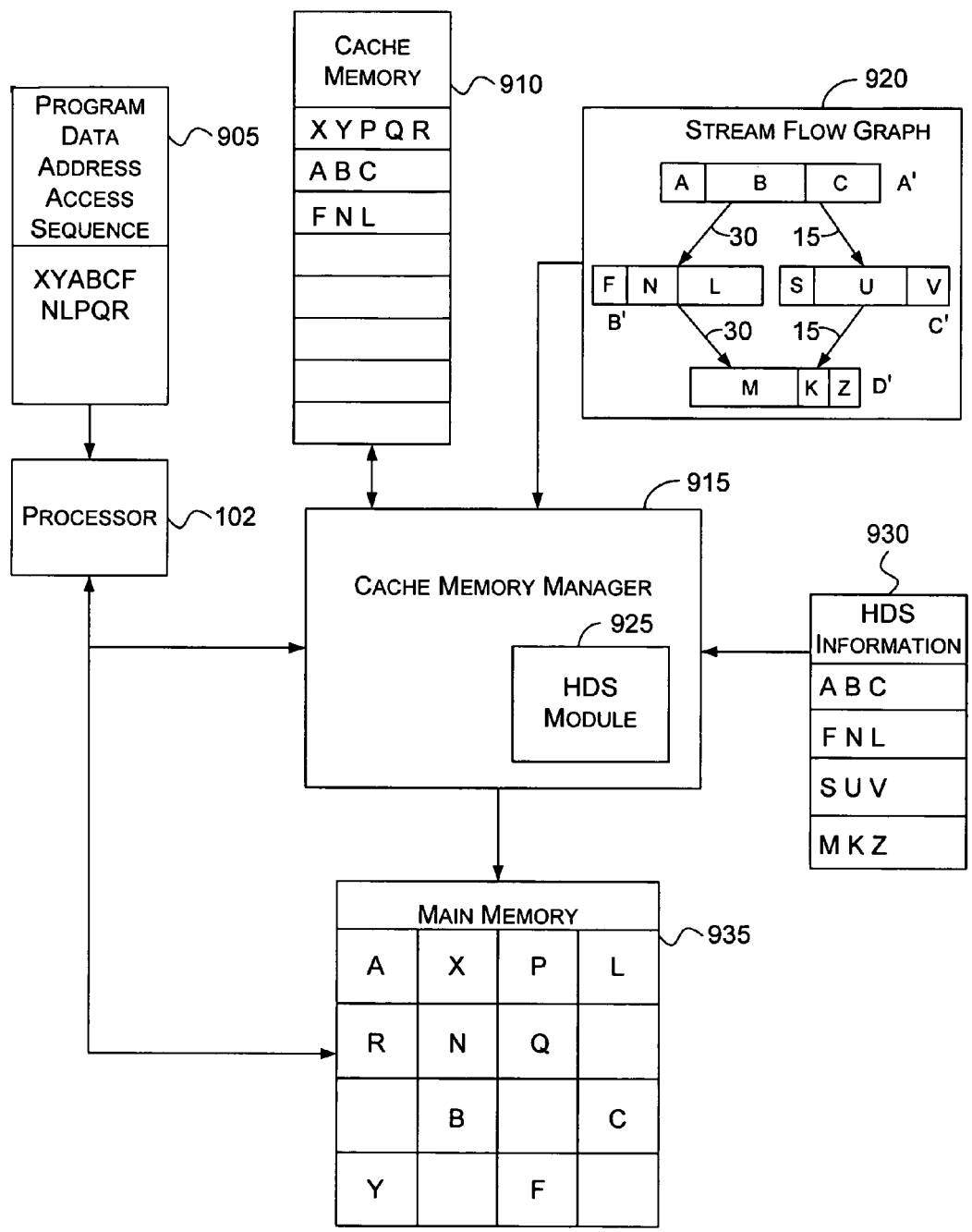
FIG. 9 is a functional block diagram illustrating a system adapted to use hot data stream information to improve program performance.

FIG. 9 is a functional block diagram illustrating a system adapted to use hot data stream information to improve program performance, according to one embodiment of the invention. The system includes program data address access sequence 905, processing unit 102, cache memory 910, stream flow graph 920, cache memory manager 915, hot data stream module 925, hot data stream information store 930, and main memory 935.

Program data address access sequence 905 includes a sequence of data addresses requested by a program. Processing unit 102 receives these requests and makes demands of cache memory 910 and main memory 935. Processing unit 102 operates as described in conjunction with FIG. 1. Cache memory manager 915 may include a hot data stream module 925 which may use information from hot data stream information store 930 and/or stream flow graph 920 to arrange cache data. Hot data stream information store 930 contains information regarding hot data streams used in the program. Main memory 935 operates similarly to memory 220 as described in conjunction with FIG. 2.

Stream flow graph 920 includes information as to how hot data streams are related and is another example of a stream flow graph similar to stream flow graph 325 of FIG. 3. In stream flow graph 920, the hot data stream designated by B' follows the hot data stream designated by A' 30 times, while the hot data stream designated by C' follows the hot data stream designated by A' 15 times. Furthermore, the hot data stream designated by D' follows the hot data stream designated by B' 30 times and hot data stream designated by C' 15 times.

Cache memory manager 915 is configured to place data from data requests from processing unit 102 in such a way as to increase program performance. One way of doing this is to place such data into cache memory such that future requests for the data are more likely to return quickly. In one example, X, Y, P, Q, and R are not shown in any hot data streams of hot data stream information store 930. Consequently, when data requests for these data items are sent from processing unit 102 to cache memory manager 915, data from these requests is placed in cache memory without concern for future reference to the items. Data access sequences ABC and FML, however, are contained in hot data stream information store 930. When cache memory manager 915 receives requests for these data elements, it arranges the data in cache memory to improve future accesses to these data elements.

While not shown in FIG. 4, hot data stream information store 930 may also be used in allocating main memory to increase program performance. For example, by placing hot data stream data sequences in the same locale, a memory manager may speed access to future data accesses. For example, when a memory manager recognizes data belonging to a hot data stream, it could place such data together on a memory page so that future accesses to the data elements in a hot data stream would cause one memory page to be accessed rather than causing several memory pages to be accessed. This is useful, for example, when, as often happens, memory pages are swapped to and from disk. Swapping two or three memory pages instead of one may take significantly longer than swapping just the one memory page. As swapping to disk is a costly procedure in terms of CPU time, reducing disk swaps improves program performance.

While cache memory 910 is shown having hot data streams ABC and FML together, this does not necessarily mean that they are located physically together or contiguously in cache memory. It simply means that given cache memory 910's characteristics, these data elements are placed in such a way in cache memory 910 that data accesses to these data elements are performed more quickly. For example, some placements of these data elements could cause a cache conflict such that data access performance was not increased in the placement.

Hot data stream information store 930 shows four separate hot data streams. However, there may be many more or fewer hot data streams than shown in hot data stream information store 930. Furthermore, the hot data streams may be of greater length or lesser length or any variety of lengths without departing from the spirit or scope of this invention.

Cache memory manager 915 may also use stream flow graph 920 to increase program performance. A component of cache memory manager 915 may be pre-fetcher 1010 of FIG. 10. Pre-fetcher 1010 may use information about the relationship between hot data streams as shown in stream flow graph 920 to pre-fetch data for use as described in more detail in conjunction with FIG. 10.

Figure 10:
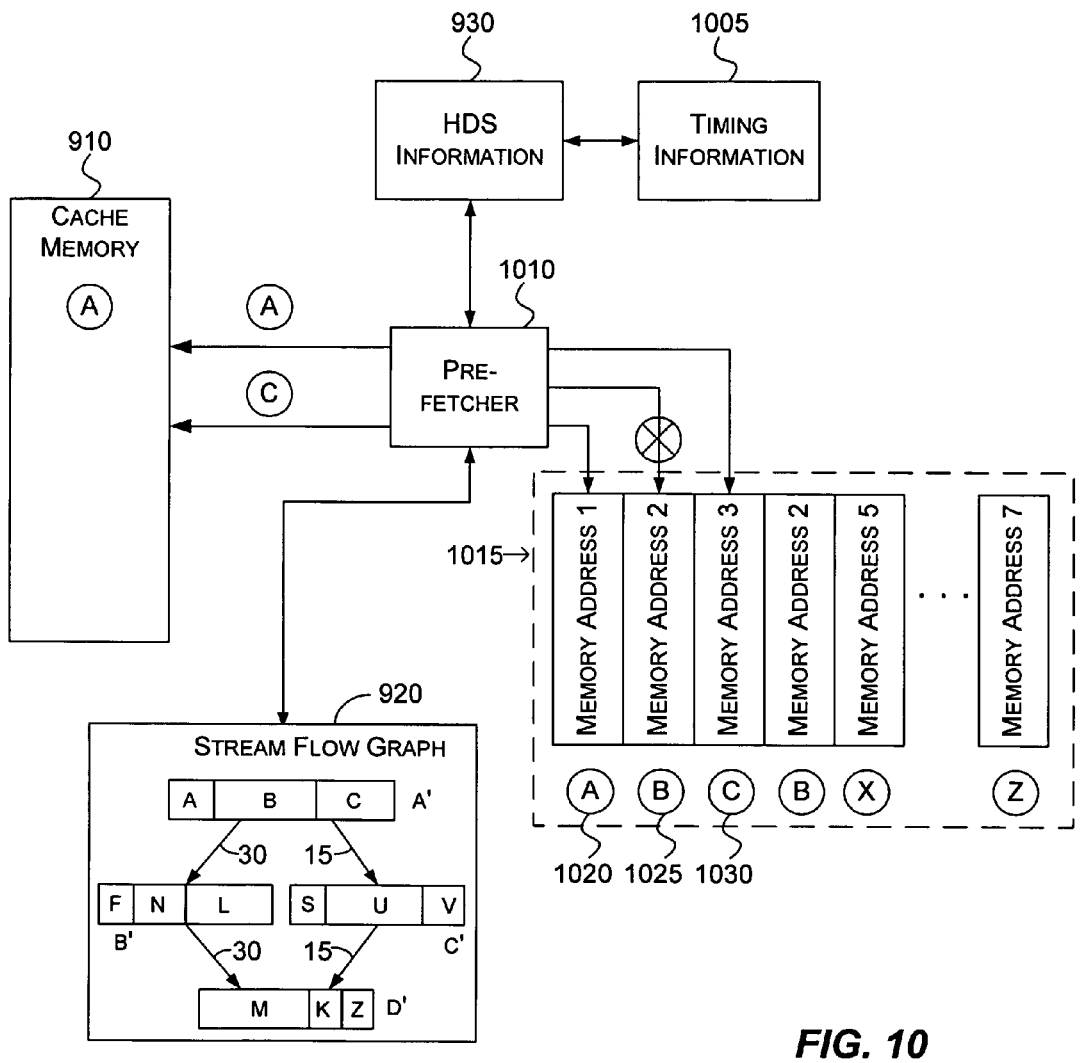
FIG. 10 is a functional block diagram illustrating a pre-fetching mechanism interacting with hot data stream information and other components to speed program execution.

FIG. 10 is a functional block diagram illustrating a pre-fetching mechanism interacting with hot data stream information and other components to speed program execution, according to one embodiment of the invention. Pre-fetcher 1010 may use data from hot data stream information store 930, timing information 1005, and stream flow graph 325 to pre-fetch data from data access sequence 1015 into cache memory 910. Hot data stream information store 930 operates as described in detail in conjunction with FIG. 9.

Timing information 1005 contains information regarding how long pre-fetcher 1010 has to retrieve a data element before it is needed by a program. Through appropriate use of timing information 1005, pre-fetcher 1010 is able to determine which data from program data access sequence 1015 can be fetched in time for the program. In the embodiment shown in FIG. 10, pre-fetcher 1010 has recognized a hot data stream including element A 1020, element B 1025, and element C 1030. Using timing information 1005, pre-fetcher 1010 determines that data element B 1025 cannot be fetched quickly enough for use by the program and also determines, however, that data element C 1030 can be fetched quick enough so that it is available for use when the program needs it. Therefore, pre-fetcher 1010 foregoes pre-fetching data element B 1025 and starts pre-fetching data element C 1030 for use by the program.

In one embodiment, pre-fetcher 1010 is configured to fetch data elements that will arrive in time for use in the program as quickly as possible. In another embodiment, pre-fetcher 1010 is configured to delay fetching data elements that can be fetched in time for use in the program until a predetermined time before the program needs the data element. Although FIG. 10 shows pre-fetcher fetching data elements from data access sequence 1015 into cache memory 910, in another embodiment, pre-fetcher 1010 fetches data elements from data access sequence 1015 into RAM. By doing this, pre-fetcher 1010 is able to avoid or reduce latencies associated with retrieving the data from disk or other slow memory.

Pre-fetcher 1010 may also use information from stream flow graph 920 in pre-fetching data elements. For example, pre-fetcher 1010 may recognize that it is currently retrieving elements for a hot data stream of a certain length. Pre-fetcher may access stream flow graph 325 to determine what hot data streams may follow the currently accessed hot data stream. Pre-fetcher 1010 may determine that there is a great probability of elements in another hot data stream being requested after the elements in the current hot data stream have been requested. At some point on or before the executing program requests the last element in the currently accessed hot data stream, pre-fetcher 1010 may begin pre-fetching data elements from the other hot data stream.

For example, when a sequence such as ABC (corresponding to hot data stream A') is found in a sequence of data requests, cache memory manager may begin pre-fetching another data stream, such as MKZ (corresponding to hot data stream D'). This may be done because of the relationship between hot data streams A' and D'. With the example stream flow graph shown in stream flow graph 920, whenever hot data stream A is encountered, some time later hot data stream D' will be encountered. This follows from the dominating relationship that hot data stream A' has over hot data stream D'. A dominating hot data stream is a hot data stream that must be accessed before elements in one or a group of other hot data streams are accessed (collectively called the hot data streams it dominates). Hot data stream A' is said to be a dominating hot data stream for hot data stream B' when the only way that elements in hot data stream B' could be accessed if is elements in hot data stream A' were accessed previously. For example, data may be accessed by a program that includes instructions as follows:
   if (A+B==C) then
     result=(F+N)*L;
   else
     result=(S+U)*V;
   result=result+(M+K)*Z In this example, if A+B equals C then result is set equal to the sum of F and N multiplied by L; otherwise, result is set equal to the sum of S and U multiplied by V. Data in variables F, N, L, S, U, and V may or may not be required when the program executes the conditional statement above, but data in variables A, B, and C is. Furthermore, some time after the data in variables A, B, and C is used, data in variables M, K, and Z will be required, no matter which branch the program follows. This relationship may be represented in a stream flow graph, such as stream flow graph 920. Pre-fetcher 1010 may use this information to begin pre-fetching elements from hot data stream D' at some point after an element for hot data stream A' is encountered.

In addition, pre-fetcher 1010 may use information about the likelihood that one hot data stream will follow another to begin pre-fetching data. For example, as currently shown in stream flow graph 920, hot data stream B' is twice as likely to follow hot data stream A' as is hot data stream C'. Thus pre-fetcher 1010 may begin pre-fetching data elements from hot data stream B' sometime after an element for hot data stream A' is encountered.

It will be recognized that stream flow graphs allow efficient computation of dominating relationships, similarly to how control flow graphs may be used to calculate dominating relationships in basic blocks.

Figure 11:
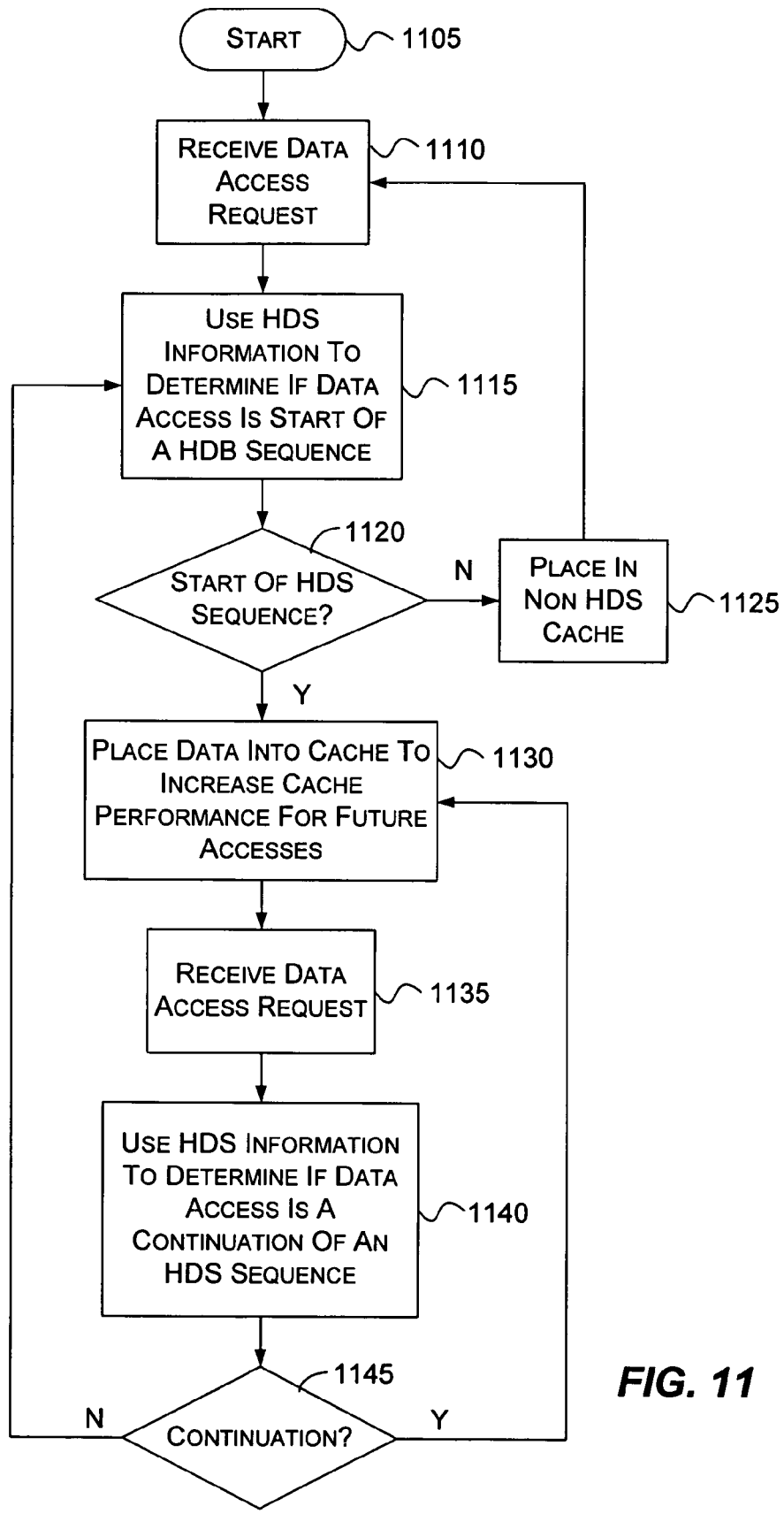
FIG. 11 is a logical flow diagram illustrating a process for dynamically increasing program performance by using hot data stream information.

FIG. 11 is a logical flow diagram illustrating a process for dynamically increasing program performance by using hot data stream information, according to one embodiment of the invention. The process begins at block 1105 after some hot data stream information is available for use.

At block 1110, a data access request is received. The data access request could come from a CPU, another computer, or some other data accessing device. For example, referring to FIG. 9, processing unit 102 could request data element X from cache memory manager 915 and main memory 935.

At block 1115, hot data stream knowledge is searched to determine if the data access "appears" to be the start of a hot data stream. The word "appears" is used because a hot data stream may or may not follow a data access request for the first element in the hot data stream. For example, a data access to a specified memory location will in some instances be followed by other data accesses as indicated by a hot data stream. In other instances, however, a data access for an element that appears to be the start of a hot data stream may not be followed by other data accesses in the hot data stream. For example, referring to FIG. 9, cache memory manager 915 searches hot data stream information store 930 to determine if X is the start of a hot data stream.

At block 1120, if the search performed at block 1115 finds that the data access appears to be the start of a hot data stream, processing branches to block 1130. Otherwise processing branches to block 1125. For example, referring to FIG. 9, cache memory manager 915 may find that X is not the start of a hot data stream in hot data stream information store 930.

At block 1125, the data from the data access request is placed in cache memory. Many different caching schemes may be used to place this data. For example, data from all non hot data stream data accesses may be placed in limited portions of the cache. This may cause these limited portions of cache to be overwritten frequently, but this may be a desired result because these limited portions of cache represent accesses to non hot data streams and do not need to be optimized as much as the data accesses to hot data streams. For example, referring to FIG. 9, cache memory manager 915 retrieves X from main memory 935 and places X in a non hot data stream portion of cache memory 910.

At block 1130, data is placed into cache memory to increase cache performance for future accesses. As described previously in conjunction with FIG. 9, this does not necessarily mean that all data in a hot data stream will be located contiguously in cache memory. To avoid cache conflicts, for example, data from data accesses may be placed appropriately in cache memory. For example, referring to FIG. 9, cache memory manager 915 places a memory access to data element A (the start of a hot data stream) into cache memory 910 in such a way to increase future cache performance for future references to data element A.

At block 1135, a data access request is received similarly to that found at block 1110. For example, referring to FIG. 9, cache memory manager 915 receives a data access request for data element B from processing unit 102.

At block 1140, hot data stream information is searched to determine if the data access request received is a continuation of a hot data stream. For example, referring to FIG. 9, cache memory manager 915 uses data from hot data stream information store 930 to determine if data element B following data element A is a continuation of a hot data stream.

At block 1145, the result of processing at block 1140 is used to determine where process flow should branch. If the data access is not a continuation of a hot data stream, processing branches to block 1115. If the data access is a continuation of a hot data stream, processing continues at block 1130.

The process shown in FIG. 11 continues until the program accessing data completes, or until the process is otherwise disabled, through, for example, turning off the feature in a cache manager.

In another embodiment of the invention, the logic and modules in FIG. 11 work in conjunction with main memory in addition to, or in lieu of, cache memory. Specifically, when data accesses are determined to be in a hot data stream, data from the data accesses is placed in pages of memory such that a retrieval of a earlier data element causes subsequent data elements of the hot data stream to be retrieved since they reside on the same page, thus potentially reducing disk swapping as previously mentioned.

In yet another embodiment of the invention, a garbage collector uses the hot data stream information to improve placement of data during a copying phase. Specifically, during copying, the garbage collector collocates in memory data elements of the same hot data stream so that the data elements are more likely to be placed in the same cache block.

Figure 12:
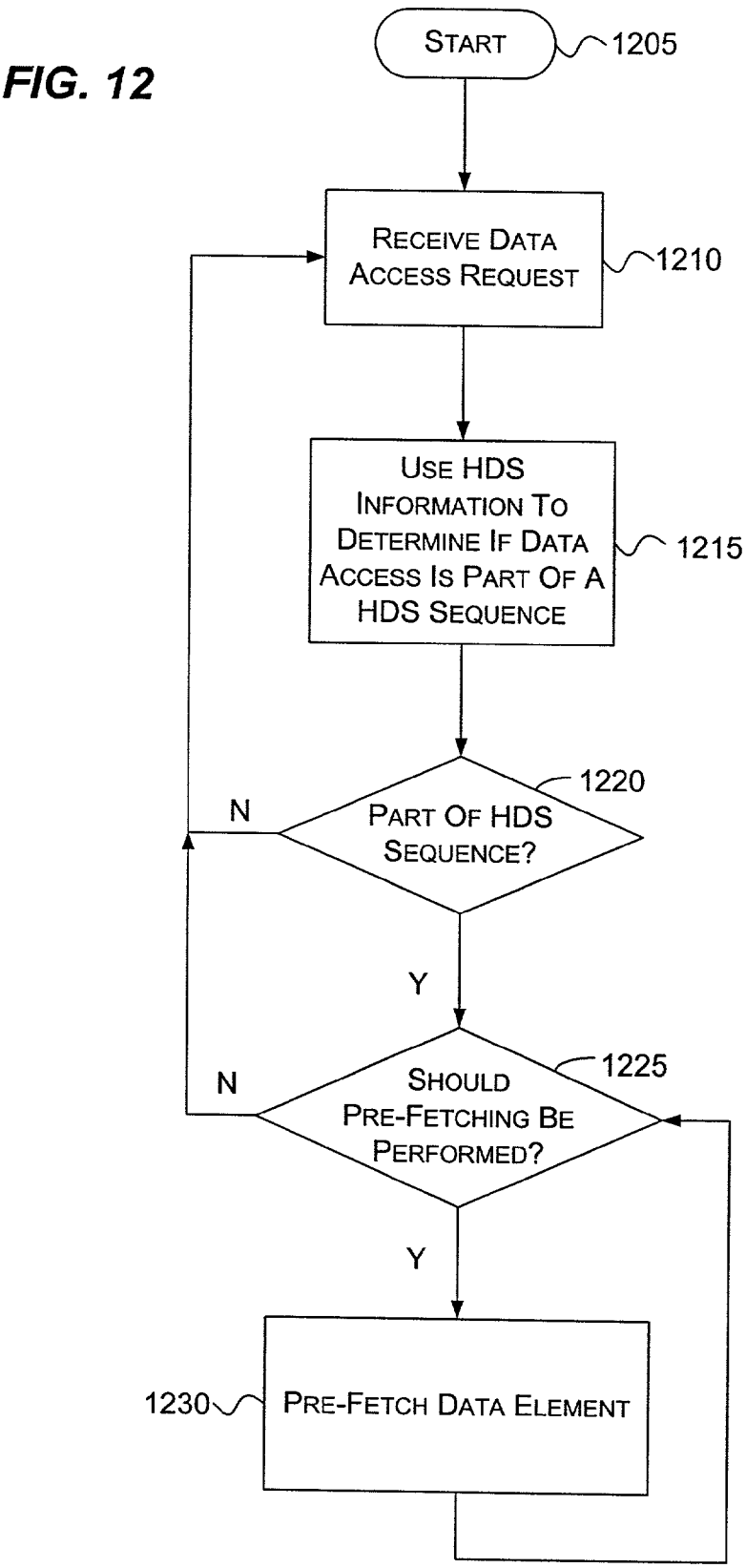
FIG. 12 is a logical flow diagram illustrating a process for dynamically increasing program performance by pre-fetching data based on data access information in accordance with the invention.

FIG. 12 is a logical flow diagram illustrating a process for dynamically increasing program performance by pre-fetching data based on data access information, according to one embodiment of the invention. The process begins at block 1205 before a data access request is received.

At block 1210, a data access request is received. The data access request could come from a CPU, another computer, or some other data accessing device.

At block 1215, hot data stream information is searched to determine if the data access appears to be part of a hot data stream. For example, referring to FIG. 10, pre-fetcher 1010 uses hot data stream information store 930 to determine if data element A appears to be a part of a hot data stream.

At block 1220, a decision is made. If the data access appears to be part of a hot data stream, processing branches to block 1225. Otherwise, processing branches to block 1220. For example, referring to FIG. 10, hot data stream information store 930 contains a sequence (shown in stream flow graph 920) of ABC. A data request of element B following a data request for element A appears to be a request for a data element that is part of a hot data stream.

At block 1225, a determination is made as to whether pre-fetching should be performed. This determination may be made depending on how soon the element can be retrieved as compared to how soon it is needed. For example, element C of the hot data stream ABC may not be able to be retrieved in time for when it is needed. An element in another hot data stream, such as element F in the hot data stream FNL, that is likely to follow the hot data stream ABC may be retrievable in time for use. Alternatively, a data element may, as a matter of course, be pre-fetched immediately after whenever a data element in a dominating hot data stream preceding the data element is requested. For example, it may be determined that data elements from the hot data stream MKZ should be pre-fetched as this hot data stream is dominated (and sure to follow) the hot data stream ABC.

At block 1230, a data element is pre-fetched. For example, referring to FIG. 5, pre-fetcher 1010 finds that data element C can be retrieved in time and starts retrieving it. This causes data element C to be in memory when it is needed. Alternatively, or in addition, one or more data elements from another hot data stream are pre-fetched, such as elements MKZ.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, and any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for processing a trace file of data accesses to obtain information that is used to improve memory usage for a computer program, comprising:
    identifying repetitively occurring data access sequences and non-repetitively occurring data access sequences in the trace file; and
    using the identified sequences to create a modified trace file, wherein the modified trace file includes data associated with the frequency that repetitively occurring data access sequences follow other repetitively occurring data access sequences when non-repetitively data access sequences are ignored.

2. The method of claim 1, wherein identifying the sequences includes steps, comprising:
    constructing a grammar from the data accesses of the trace file;
    building a candidate sequence using the grammar; and
    if a cost of accessing data in the candidate sequence exceeds a threshold, marking the candidate sequence as a repetitively occurring data access sequence.

3. The method of claim 2, wherein computing the cost comprises multiplying a number of times the candidate sequence occurs in the grammar by a number of data accesses in the candidate sequence.

4. The method of claim 1, further comprising using the identified data access sequences to update a stream flow graph that indicates the frequency that repetitively occurring data access sequences follow other repetitively occurring data access sequences when non-repetitively data access sequences are ignored.

5. The method of claim 1, wherein data accesses from the trace file are received as the computer program executes.

6. The method of claim 1, wherein the data access trace file is retrieved from a computer-readable medium.

7. The method of claim 1, wherein the modified trace file is further processed to compress data in it by steps, comprising:
identifying other sequences of repetitively occurring data access sequences in the modified trace file; and
using the other sequences to create another trace by removing less frequently occurring data access sequences from the modified trace file.

8. The method of claim 7, wherein the other trace is used to pre-fetch data.

9. The method of claim 7, wherein the other trace is used in placing data in a cache.

10. A storage medium having computer-executable instructions encoded thereon for improving data accesses, the instructions comprising:
receiving data access information from an executing program;
identifying repetitively occurring data access patterns and non-repetitively occurring data access patterns; and
updating a data structure to reflect the frequency that repetitively occurring data access patterns follow other repetitively occurring data access patterns when non-repetitively data access patterns are ignored.

11. The storage medium of claim 10, wherein the data access information is received on a computer upon which the executing program is executing.

12. The storage medium of claim 10, wherein the data access information is received on a computer other than a computer upon which the executing program is executing.

13. The storage medium of claim 10, wherein a grammar representing the data access information is used in identifying when the data access information is part of a frequently occurring data access pattern.

14. The storage medium of claim 10, wherein the data structure is a stream flow graph.

15. The storage medium of claim 14, wherein the stream flow graph is used to pre-fetch data into memory.

16. The storage medium of claim 15, wherein data is pre-fetched depending on the probability of the data being requested based on a current data access request.

17. A storage medium having a data structure stored thereon, comprising:
a database structured to store data access information that includes data access sequences of a computer program;
a stream flow graph structured to store data that indicates a frequency that a data access sequence follows another data sequence; and
a pre-fetcher configured to use the data access information and the stream flow graph to fetch data elements into memory for use by the executing computer program.

18. The storage medium of claim 17, wherein the data structure further comprises timing information that is used to determine when the data element should be retrieved.

19. The storage medium of claim 17, wherein during requests for data in one data access sequence, pre-fetching begins for data in another data access sequence that will follow.

20. The storage medium of claim 19, wherein the other data access sequence follows when the one data access sequence dominates the other data access sequence.

21. A storage medium having computer-executable components, comprising:
a database configured to store a stream flow graph;
a database configured to store data access sequence information; and
a cache memory manager coupled to the stream flow graph database and the data access sequence database, wherein the cache memory manager is configured to arrange data elements of a repetitively accessed data stream in a cache using information from the two databases.

22. The storage medium of claim 21, wherein the data elements of one repetitively accessed data stream are arranged in the cache to avoid a cache conflict.

* * * * *

UNITED STATES PATENT AND TRADEMARK OFFICE
CERTIFICATE OF CORRECTION

PATENT NO. : 6,971,092 B1  
DATED : November 29, 2005  
INVENTOR(S) : Chilimbi

It is certified that error appears in the above-identified patent and that said Letters Patent is hereby corrected as shown below:

Column 20,  
Line 12, after "data" insert -- access --.

Signed and Sealed this

Twenty-fifth Day of April, 2006

JON W. DUDAS  
*Director of the United States Patent and Trademark Office*